United States Patent
Forster

[11] Patent Number: 6,135,259
[45] Date of Patent: Oct. 24, 2000

[54] HUB DRIVE

[75] Inventor: Franz Forster, Karlstadt-Mühlbach, Germany

[73] Assignee: Linde Aktiengesellschaft, Germany

[21] Appl. No.: 09/239,163

[22] Filed: Jan. 28, 1999

[30] Foreign Application Priority Data

Feb. 10, 1998 [DE] Germany ............................ 198 05 300

[51] Int. Cl.$^7$ .................................................. B60K 41/26
[52] U.S. Cl. ........................ 192/221.1; 180/307; 475/83; 475/331
[58] Field of Search ................................... 180/6.48, 305, 180/307; 192/221.1; 475/83, 331; 188/106 P

[56] References Cited

U.S. PATENT DOCUMENTS

| | | | |
|---|---|---|---|
| 3,754,625 | 8/1973 | Voth et al. | 192/221.1 |
| 4,010,830 | 3/1977 | Logus et al. | 192/221.1 |
| 4,407,382 | 10/1983 | Dziuba et al. | 180/10 |
| 5,398,776 | 3/1995 | Forster | 180/308 |

*Primary Examiner*—Allan D. Herrmann
*Attorney, Agent, or Firm*—Webb Ziesenheim Logsdon Orkin & Hanson, P.C.

[57] ABSTRACT

A hub drive is provided with a hub which is mounted on a hub support and with a brake device. The hub can be driven by a drive shaft with the interposition of a transmission preferably realized in the form of a planetary gear train. To be able to use the brake device of the hub drive, which has compact dimensions, both as a service brake and as a holding brake, each with good performance characteristics, the invention teaches that the brake device has a first and a second brake. The first brake is used to couple the drive shaft with the hub support with the interposition of the planetary gear train, and is used as a service brake. The second brake can be used to couple the hub and thus the web of the planetary gear train to the hub support, as a result of which it can be used as a holding brake. To save space, the first brake is located radially inside the second brake. The two brakes, which are preferably realized in the form of multi-disc brakes, have a common brake stator support, which is provided with a hollow cylindrical axial web. The brake discs of the first brake are located radially inside the axial web, and the brake discs of the second brake are located radially outside the axial web. As a result of the radial webs which are molded onto the axial web or are otherwise connected to it, and are realized so that they can absorb the braking forces that are exerted in the axial direction, there is a closed power flux in the brake stator.

17 Claims, 2 Drawing Sheets

HUB DRIVE

BACKGROUND OF THE INVENTION

1. Field of the Invention

The invention relates generally to a hub drive with a hub mounted on a hub support and having an integrated brake device. The hub can be driven by a drive shaft with the interposition of a transmission.

2. Description of the Currently Available Technology

DE 42 28 746 A1 describes a generic hub drive in which the brake device consists of a spring-loaded multi-disc brake which, in the braking position, couples the faster-moving drive shaft to the slower-moving hub. The hub of this hub drive is non-rotationally connected to the web of the transmission, which is realized in the form of a planetary gear train. The sun wheel of the planetary gear train is non-rotationally connected to the drive shaft. The planetary gear train acts like a locking mechanism on account of the stationary ring gear, which is utilized in the braking position to generate a braking torque.

A braking device of this type can theoretically be used as a service brake and/or as a holding brake although, depending on the application, it has disadvantages. For example, if the brake is used as a service brake, i.e., to decelerate a vehicle that is moving at a determined speed, the generally very high drag torque of the slower-moving hub must be absorbed. Accordingly, on account of the small diameter of the brake discs, a large braking force must be applied in the axial direction, which is accomplished by a package of disc springs. To compensate for the braking force during normal operation of the vehicle, to release the brake a large and powerful release device is necessary, which in the hub drive of the known device is embodied in the form of a large cylinder-piston unit.

If the known braking device is used as a holding brake, for example to stop an excavator (mobile excavator) equipped with the generic hub drive when the work device (excavator bucket) is actuated, it is necessary, on account of the high biting forces of the excavator, to have a holding torque that far exceeds the braking torque that must be applied to stop the moving excavator.

This considerable holding torque is introduced into the hub support via the planetary gears of the gear train. While this generally does not represent any problem when the braking device is used as a service brake, when the braking device is used as a holding brake, on one hand the stresses on the transmission are increased, which reduces the useful life of the transmission, and on the other hand when the holding torque is being introduced into the transmission, there is a high transmission play on account of elastic deformations, which is reflected during work with the excavator in the form of unpleasant reactions to changes in the load. Consequently, a typical known hub drive is nothing more than a compromise that does not have satisfactory characteristics in either of the two operating situations described above.

In other known hub drives, only a service brake is located between the high-speed drive shaft and the input of the transmission. The drag torque that must be absorbed is thereby reduced by the upstream position of the transmission (or the braking torque generated by the service brake is amplified by the transmission). To also be able to build up sufficiently large biting forces, additional, external holding brakes are used. Such a system increases the size of the hub drive and results in increased time, effort and expense in terms of manufacture, assembly and maintenance.

Therefore, it is an object of this invention to provide a generic hub drive that has compact dimensions, the braking device of which has an improved function in the operating situations described above.

SUMMARY OF THE INVENTION

The invention teaches that the brake device has a first and a second brake. The first brake is realized so that it couples the drive shaft and/or a transmission input element with the hub support. The second brake is realized so that it couples the hub and/or a transmission output element with the hub support, with the first brake essentially located radially inside the second brake.

Consequently, the first brake acts on the higher-speed drive shaft and, as a result of its position in the circuit upstream of the transmission, takes advantage of the gear reduction that takes place downstream. The braking torque applied by this brake to decelerate a moving vehicle is therefore low, which has the advantage that it becomes possible to achieve a compact construction of the brake. The size of the first brake in the radial direction can therefore be very small.

The second brake acts on the slower-moving hub and correspondingly must apply a significantly higher braking torque. As a result of its location radially above or outside the first brake, sufficient space is available so that the size of the second brake can be made sufficiently large. The location of the second brake in the circuit downstream of the transmission means that neither the transmission play nor the load on the transmission are influenced by the drag torque of the hub or by the braking torque. The overall result is a space-saving system in which the two brakes are located radially one above the other so that there is a disc-shaped layout of the braking device. As a result of the operation of the two brakes described above, it is appropriate if the first brake is used as a service brake and the second brake as a holding brake.

In one advantageous embodiment of the invention, the two brakes have a common brake stator having a hollow, cylindrical, axial web. Radially inside the axial web, there is at least one brake rotor and one brake stator of the first brake and radially outside the axial web there is at least one brake rotor and one brake stator of the second brake. The two brakes thus use a common component to introduce the braking torques into the hub support. This arrangement results in a significant simplification of the construction of the hub drive of the invention.

If the brake stator has radial webs molded or otherwise connected to the axial web, which radial webs are realized so that they absorb the braking forces that are exerted in the axial direction, the result is a closed power flux. The reaction forces are thereby always supported in the same component, namely the brake stator, on the side opposite the working line of the braking force. Therefore, there are no stray forces that are exerted on other components of the hub drive.

The invention also teaches that it is preferable to pressurize the first brake in the direction of the closed position with fluid under pressure. The vehicle is therefore decelerated more or less sharply as a function of the level of the hydraulic pressure. The first brake appropriately has a retraction mechanism that acts to move it toward the open position.

In another embodiment of the invention, the second brake is pressurized toward the closed position by a spring force, and toward the open position by a fluid under pressure. The result is a conventional spring-loaded brake, in which no additional energy needs to be applied to hold in position the vehicle equipped with the hub drive of the invention.

If the brake stator has hydraulic channels, at least one hydraulic channel of which emerges upstream of a brake piston of the first brake and at least one hydraulic channel of which emerges upstream of a brake piston of the second brake, the fluid required to actuate the two brakes can be transported to the sites of its activity with minimal effort. Special hydraulic lines are therefore unnecessary.

For the most compact construction possible of the hub drive of the invention, it is advantageous if the transmission is realized in the form of a planetary gear train, the sun wheel of which is non-rotationally connected to the drive shaft and the web of which is non-rotationally connected to the hub.

The invention teaches that it is advantageous to mount the hub on the hub carrier by means of two tapered roller bearings, whereby the brake stator is realized so that it is in axial contact against the neighboring tapered roller bearing. In such an arrangement, the fastening of the brake stator simultaneously biases the heavy-duty tapered roller bearings with respect to one another. The effort and expense required for manufacture and assembly are thereby reduced.

In an additional embodiment, the invention teaches that it is possible to further reduce the manufacturing and assembly effort required by providing the first brake with a brake rotor support that is connected with a coupling box that is non-rotationally connected to the transmission input element. This connection can be configured so that the coupling box and the brake rotor support are realized in the form of a single piece. When the transmission is realized in the form of a planetary gear train, the transmission input element is formed by its sun wheel. For the connection to the coupling box, the sun wheel is preferably provided with a molded-on lug that projects into the coupling box and has torque transmission means (e.g. longitudinal toothing).

If the brake stator is non-rotationally connected to a ring gear of the planetary gear train, it is sufficient to secure only one of these components to prevent rotation to also obtain torque support for the other component. For this purpose, it is appropriate to locate drive gearing on the brake stator and on the ring gear, respectively.

The brakes of the hub drive of the invention are advantageously realized in the form of multi-disc brakes. This configuration has advantages in terms of compact size and long life.

One configuration of the hub drive of the invention in which the hub support is molded onto a traction motor, results in a further reduction of the effort and cost entailed in manufacturing and assembly. In this configuration, the hub is mounted directly on a housing segment of the traction motor.

Finally, the invention teaches that it is favorable if a hydraulic motor, in particular a traction motor realized in the form of a hydrostatic axial piston motor utilizing a swash plate construction, is used, wherein the shaft of the axial piston motor forms the faster-moving drive shaft. For this purpose, the brake fluid supply feed can be integrated into the overall hydraulic system.

BRIEF DESCRIPTION OF THE DRAWINGS

Additional details and advantages of the invention are explained below, with reference to the exemplary embodiments that are illustrated in the accompanying schematic figures, in which.

DESCRIPTION OF THE PREFERRED EMBODIMENTS

For purposes of the description hereinafter, the terms "left", "right", "above", "below" and similar spacial terms relate to the invention as it is oriented in the figures. However, it is to be understood that the invention may assume various alternative variations and step sequences, except where expressly specified to the contrary.

Figure 1:
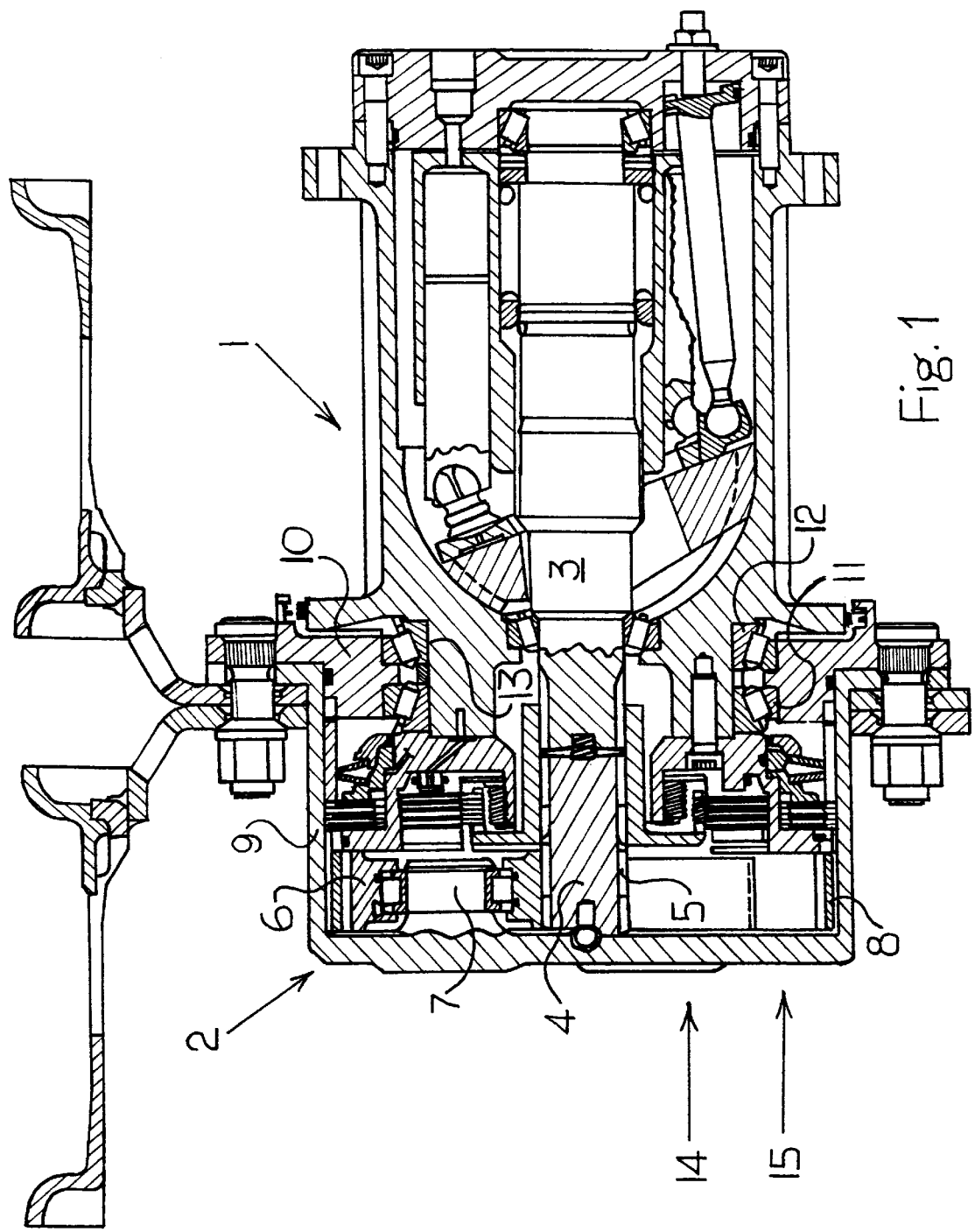
FIG. 1 is a section through a hub drive of the invention.

As shown in FIG. 1, a hub drive of the invention has a traction motor 1, which in this embodiment is realized in the form of an adjustable hydrostatic axial piston motor utilizing a swash plate construction, downstream of which is a single-stage planetary gear train 2 which is provided to create a firm connection with an axle tube or another component suitable for fastening the hub drive.

The hub drive is provided with a drive shaft 3 which is identical with the shaft of the traction motor 1. The drive shaft 3 is non-rotationally coupled with a lug 4 which is molded onto a sun wheel 5 of the planetary gear train 2, which in this embodiment represents a transmission input element. The sun wheel 5 is engaged with planetary gear wheels 6 which are mounted on a web 7 and circulate in a ring gear 8. The ring gear 8 is protected against rotation in a manner described in greater detail below. The web 7 forms a transmission output element of the planetary gear train 2. The web 7 is molded onto a cup-shaped housing 9, which is non-rotationally connected with a rotating hub 10 of the hub drive.

The rotating hub 10, which is provided for the housing of wheel rims, is mounted on a housing segment of the traction motor 1 by means of two tapered roller bearings 11 and 12 which, in this embodiment, are realized in the form of conical roller bearings. This housing segment therefore assumes the function of a hub support 13.

Located axially between the traction motor 1 and the planetary gear train 2 is a braking device which, in accordance with the invention, comprises a first brake 14 and a second brake 15. The first brake 14 is located radially inside the second brake 15, whereby the layout of the brake device is somewhat disc-shaped. The two brakes 14 and 15 are realized in the form of multi-disc brakes, i.e., each second brake disc of the respective disc packet rotates while the remaining brake discs, i.e., the ones located between the rotating brake discs, do not rotate. The rotating brake discs therefore represent brake rotors. The stationary brake discs function as brake stators. The braking action is achieved by pressing the brake rotors and stators together in the axial direction. The rotors and stators are provided with friction linings on the front and back side.

Figure 2:
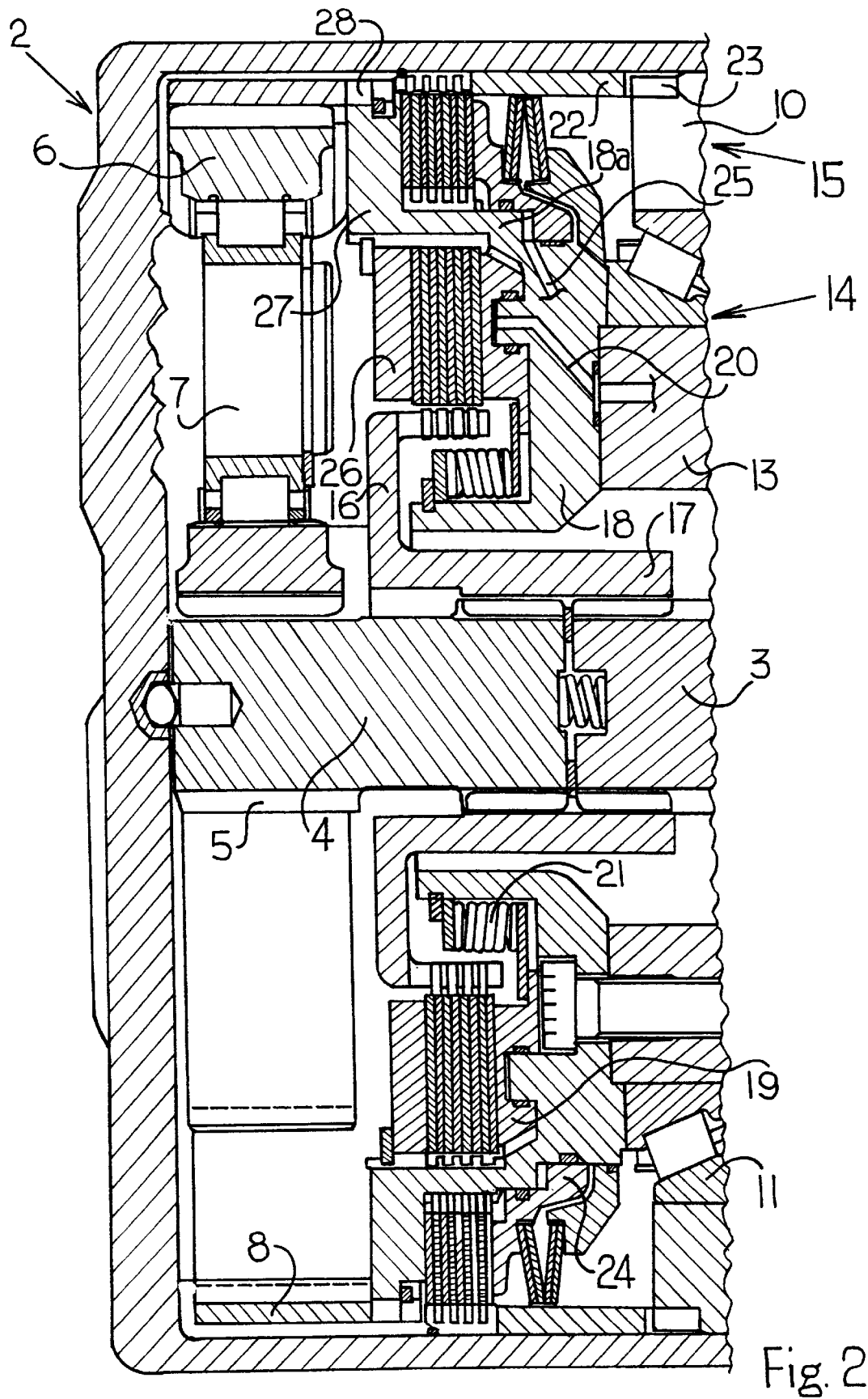
FIG. 2 is an enlarged view of the left side of FIG. 1.

As shown in FIG. 2, the first brake 14 has a brake rotor support 16 that is preferably manufactured in one piece with a coupling box 17, which connects the drive shaft 3 with the lug 4 of the sun wheel 5 of the planetary gear train 2. To transmit torque, the coupling box 17 has a female longitudinal gearing, which is engaged with the male longitudinal gearing of the drive shaft 3 and of the lug 4.

The two brakes 14 and 15 have a common brake stator support 18 with a hollow, cylindrical, axial web 18a. Radially inside the axial web 18a are the brake rotors (rotating brake discs) and brake stators (stationary brake discs) of the first brake 14. Radially outside the axial web 18a are the brake rotors and brake stators of the second brake 15.

The brake stator support 18 is bolted to the housing of the traction motor 1, i.e., to the hub support 13, or is otherwise non-rotationally and firmly connected to this housing.

The brake rotors of the first brake 14 can move axially with the brake rotor support 16, but the connection is non-rotational. The first brake 14 can consequently couple the drive shaft 3 or the input element of the transmission with the hub support 13. The first brake 14 is actuated by means of a brake piston 19, which can be pressurized by a fluid under pressure (hydraulic fluid) toward a closed position. The fluid supply is delivered through a hydraulic fluid channel 20 in the brake stator support 18 that emerges upstream of the brake piston 19. A retraction mechanism in the form of coil springs 21 ensures that the brake piston 19 returns to its starting position (open position of the brake) when the first brake 14 is unpressurized.

The brake rotors of the second brake 15 can move axially with a sleeve-shaped brake rotor support 22, but they are connected to it non-rotationally. This brake rotor support 22 is non-rotationally connected to the hub 10 by means of spline 23. Consequently, the second brake 15 can couple the hub 10 with the hub support 13. The second brake 15 is preferably always biased by the force of a spring (by means of disc springs) toward the closed position. Therefore it is always closed in the starting position. The brake is actuated, i.e., opened, by a fluid under pressure by means of a brake piston 24. The fluid is supplied through a hydraulic fluid channel 25 in the brake stator support 18 that emerges upstream of the brake piston 24.

To compensate for the braking forces of the first brake 14 that are exerted in the axial direction, the brake stator 18 has a radial web 26 that is connected with the axial web 18a. For the second brake 15, there is a radial web 27 molded onto the axial web 18a for the same purpose. The axial reaction forces that are exerted opposite to the braking forces are therefore always absorbed in the same component, namely the brake stator support 18. Thus there is a closed power flux within the brake stator support 18. Therefore, there are no stray forces that are exerted on other components of the hub drive.

The brake device claimed by the invention and described above is preferably used so that the first brake 14 is used as the service brake and the second brake 15 as the holding brake.

The first brake 14 acts on the higher-speed drive shaft 3 and, therefore on account of the location upstream of the planetary gear train 2, uses its reduction gearing to reinforce the braking torque. The first brake 14 therefore requires only a small amount of space. Its radial dimension is small.

The second brake 15 acts on the slower-moving hub 10. The braking torque to be applied by the second brake 15 is greater than the braking torque of the first brake 14 reinforced by the planetary gear train 2. As a result of the physical location of the second brake 15 radially outside the first brake 14, sufficient space is available for the generation of this greater braking torque. The location of the second brake 15—in the circuit, bypassing the planetary gear train 2—means that neither the load on the transmission nor the transmission play are influenced by the braking torque.

By means of a drive gearing 28, with which both the brake stator 18 and the ring gear 8 of the planetary gear train 2 are provided, the brake stator 18 is non-rotationally connected to the ring gear 8. In this manner, the brake stator 18 acts as a torque support for the planetary gear train 2. As a result of the separate realization of the two components, the ring gear 8 can be manufactured easily, preferably by broaching. The planetary gear train 2 is thereby also given an additional degree of freedom.

It will be readily appreciated by those skilled in the art that modifications may be made to the invention without departing from the concepts disclosed in the foregoing description. Such modifications are to be considered as included within the following claims unless the claims, by their language, expressly state otherwise. Accordingly, the particular embodiments described hereinabove are illustrative only and are not limiting to the scope of the invention, which is to be given the full breadth of the appended claims and any and all equivalents thereof.

I claim:

1. A hub drive having a hub mounted on a hub support, comprising:

a drive shaft;

a transmission; and an integrated brake device, the brake device having a first brake and a second brake, with the first brake configured to couple at least one of the drive shaft and a transmission input element that is non-rotationally coupled to the drive shaft with the hub support, and with the second brake configured to couple at least one of the hub and a transmission output element to the hub support, wherein the first brake is located substantially radially inside the second brake.

2. The hub drive as claimed in claim 1, wherein the first brake is a service brake and the second brake is a holding brake.

3. The hub drive as claimed in claim 1, wherein the first and second brakes have a common brake stator support which is provided with a hollow, cylindrical axial web, wherein at least one brake rotor and at least one brake stator of the first brake are located radially inside the axial web, and wherein at least one brake rotor and at least one brake stator of the second brake are located radially outside the axial web.

4. The hub drive as claimed in claim 3, wherein the brake stator support has radial webs connected to the axial web and are configured to absorb braking forces exerted in an axial direction.

5. The hub drive as claimed in claim 1, wherein the first brake is pressurized toward a closed position by fluid under pressure.

6. The hub drive as claimed in claim 5, wherein the first brake has a retraction mechanism configured to move the first brake toward an open position.

7. The hub drive as claimed in claim 1, wherein the second brake is pressurized toward a closed position by the force of a spring and is pressurized toward an open position by fluid under pressure.

8. The hub drive as claimed in claim 5, including a brake stator support, wherein the brake stator support has hydraulic channels, at least one hydraulic channel of which emerges upstream of a brake piston of the first brake, and at least another hydraulic channel of which emerges upstream of a brake piston of the second brake.

9. The hub drive as claimed in claim 1, wherein the transmission includes a planetary gear train having a sun wheel non-rotationally connected to the drive shaft and a web non-rotationally connected to the hub.

10. The hub drive as claimed in claim 3, wherein the hub is mounted by tapered roller bearings on the hub support, wherein the brake stator support is realized so that it is in axial contact against an adjacent tapered roller bearing.

11. The hub drive as claimed in claim 1, wherein the first brake has a brake rotor support connected with a coupling box that non-rotationally connects the drive shaft to the transmission input element.

12. The hub drive as claimed in claim 9, wherein the first and second brakes have a common brake stator support non-rotationally connected with a ring gear of the planetary gear train.

13. The hub drive as claimed in claim 12, including drive gearings located on the brake stator support and on the ring gear, respectively.

14. The hub drive as claimed in claim 1, wherein the first and second brakes are multi-disc brakes.

15. The hub drive as claimed in claim 1, wherein the hub support is molded onto a traction motor.

16. The hub drive as claimed in claim 1, including a traction motor having a shaft which forms the drive shaft.

17. The hub drive as claimed in claim 16, wherein the traction motor includes a hydrostatic axial piston motor having a swash plate.

* * * * *